(12) United States Patent
Yin et al.

(10) Patent No.: US 10,712,585 B2
(45) Date of Patent: Jul. 14, 2020

(54) OPTICAL GRATING AND 3D DISPLAY DEVICE

(71) Applicant: BOE Technology Group Co., Ltd., Beijing (CN)

(72) Inventors: Guobing Yin, Beijing (CN); Jiyang Shao, Beijing (CN); Min Peng, Beijing (CN); Xingdong Liu, Beijing (CN); Yuting Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 141 days.

(21) Appl. No.: 15/646,797

(22) Filed: Jul. 11, 2017

(65) Prior Publication Data

US 2018/0059427 A1   Mar. 1, 2018

(30) Foreign Application Priority Data

Aug. 23, 2016   (CN) .......................... 2016 1 0707435

(51) Int. Cl.
  *G02B 30/27*   (2020.01)
  *G02F 1/13*   (2006.01)
  *G02F 1/137*   (2006.01)

(52) U.S. Cl.
  CPC ............. *G02B 30/27* (2020.01); *G02F 1/137* (2013.01); *G02F 1/1313* (2013.01); *G02F 2201/30* (2013.01)

(58) Field of Classification Search
  CPC ........ G02B 30/27; G02F 1/1313; G02F 1/137
  See application file for complete search history.

(56) References Cited

U.S. PATENT DOCUMENTS

| | | | | |
|---|---|---|---|---|
| 2010/0039707 A1* | 2/2010 | Akahane | ................ | B82Y 30/00 359/576 |
| 2013/0234009 A1* | 9/2013 | Guldimann | ............... | G01J 3/02 250/227.2 |

FOREIGN PATENT DOCUMENTS

| | | |
|---|---|---|
| CN | 102109706 A | 6/2011 |
| CN | 104614793 A | 5/2015 |

OTHER PUBLICATIONS

Office Action, including Search Report, for Chinese Patent Application No. 201610707435.9, dated Jun. 28, 2018, 12 pages.

* cited by examiner

*Primary Examiner* — Lucy P Chien
(74) *Attorney, Agent, or Firm* — Westman, Champlin & Koehler, P.A.

(57) ABSTRACT

Embodiments of the present disclosure provide an optical grating and a 3D display device having the same. The optical grating comprises a plurality of grating units arranged from a center of the optical grating towards two sides thereof, values of grating periods of a plurality of said grating units on either side of the center being non-linearly decreased progressively from the center to the side.

9 Claims, 4 Drawing Sheets

OPTICAL GRATING AND 3D DISPLAY DEVICE

CROSS-REFERENCE TO RELATED APPLICATION

This application claims the benefit of the Chinese Patent Application No. 201610707435.9 filed on Aug. 23, 2016 in the State Intellectual Property Office of China, the whole disclosure of which is incorporated herein by reference.

BACKGROUND

Technical Field

Embodiments of The present disclosure generally relate to the field of display technologies, and particularly, to an optical grating and a 3D display device.

Description of the Related Art

With continuous development of display technologies, 3D (three dimensional) display has become an important developing tendency in the display domain. 3D products become more and more popular, and 3D displays gradually go into the public family. In recent years, 3D display technologies achieve 3D display mainly by means of stereoscopic spectacles. In order to further improve viewing comfort and get rid of restraints of the stereoscopic spectacles, people have continuously attempted to view 3D images/videos through naked eyes, which has rapidly become one of current research focuses.

Currently, naked-eye 3D display technologies mainly include a light barrier type (also called as parallax barrier type) and a lenticular lens type, where lenticular lens technologies are higher in production cost due to being not compatible with existing LCD manufacturing processes and are very difficult in promotion and popularization. In the parallax barrier type naked-eye 3D technologies, a layer of optical grating barrier is added at a display side of a display panel, the optical grating comprising light shielding stripes and light transmission stripes alternately arranged. In a stereoscopic display mode, under shielding effect of the optical grating, a left eye image formed by left eye pixels enters the left eye of an observer, while a right eye image formed by right eye pixels enters the right eye of the observer. The left eye image and the right eye image are superposed and synthesized in human brain, such that the observer can obtain depth perception, thereby achieving 3D display.

SUMMARY

Embodiments of the present disclosure provide an optical grating and a 3D display device, which enable an optimal viewing region of the grating to be extended in a longitudinal direction, thereby improving viewing experience.

In an aspect of the present disclosure, an embodiment provides an optical grating, comprising a plurality of grating units arranged from a center of the optical grating towards two sides thereof, values of grating periods of a plurality of said grating units on either side of the center being non-linearly decreased progressively from the center to the side.

In an embodiment, the optical grating includes a plane grating.

In an embodiment, the grating period, $W_n$, of the $n^{th}$ grating unit starting from the center of the plane grating, is:

$$W_n = \frac{a_n^2}{a_1^2 + a_2^2 + \ldots + a_N^2} \cdot \frac{W_T}{2}$$

where $W_T$ is a total width of the plane grating; N is the number of the grating units on either side of the center of the plane grating; $a_1, a_2, \ldots, a_N$ are user-defined coefficients for grating periods of the respective grating units on either side of the center of the plane grating and satisfy a linearly progressive decreasing relation.

In an embodiment, the optical grating includes a curved grating.

In an embodiment, the grating period, $W_n$, of the $n^{th}$ grating unit starting from the center of the curved grating, is:

$$W_n = \frac{a_n^2}{a_1^2 + a_2^2 + \ldots + a_N^2} \cdot \frac{\theta}{2} \cdot R$$

where R is a curvature radius of the curved grating; $\theta$ is a central angle of the curved grating; N is the number of the grating units on either side of the center of the curved grating; $a_1, a_2, \ldots, a_N$ are user-defined coefficients for grating periods of the respective grating units on either side of the center of the curved grating and satisfy a linearly progressive decreasing relation.

In an embodiment, $0.9 \leq a_N/a_1 < 1$.

In an embodiment, the optical grating includes a liquid crystal grating.

In an embodiment, the liquid crystal grating comprises a first substrate and a second substrate arranged opposite to each other, a liquid crystal layer disposed between the first substrate and the second substrate, and electrodes arranged on a side of at least one of the first substrate and the second substrate facing the liquid crystal layer, the electrodes are configured and arranged to, when being applied with a voltage, control transmission of light through the liquid crystal layer at different positions such that a liquid crystal grating is formed with a plurality of light shielding stripes and a plurality of light transmission stripes alternately arranged, and grating periods of a plurality of grating units defined by the light shielding stripes and the light transmission stripes of the liquid crystal grating are non-linearly decreased progressively from the center of the liquid crystal grating towards either side thereof.

In an embodiment, the optical grating comprises a plurality of light shielding stripes and a plurality of light transmission stripes alternately arranged, and if the center of the optical grating is located at an interface between a light shielding stripe and a light transmission stripe adjacent thereto, the grating period of each of the grating units is equal to a sum of widths of one light shielding stripe and one light transmission stripe located adjacent to each other on a same side of the center of the optical grating;

if the center of the optical grating is located at a center of the light shielding stripe, the grating period of each of the grating units is equal to a width from a center of one light shielding stripe to a center of a next light shielding stripe located at the same side of the center of the optical grating as the one light shielding stripe; and if the center of the optical grating is located at a center of the light transmission, the grating period of each of the grating units is equal to a width from a center of one light transmission stripe to a center of a next light transmission stripe located at the same side of the center of the optical grating as the one light transmission stripe.

In an embodiment, an aperture ratio of the optical grating is 0.3.

In an embodiment, the values of the grating units are within a range from 6 microns to 500 microns.

In another aspect of the present disclosure, an embodiment provides a 3D display device, comprising a display panel and the optical grating as described in any of embodiments of the present disclosure, the optical grating being arranged at a light exit side of the display panel.

Further aspects and features will become apparent from the description made herein. It should be understood that respective aspects, embodiments and/or features of the present disclosure may be implemented in combination with one or more other aspects, embodiments and/or features. It should also be understood that the description and specific embodiments described herein are merely provided for purpose of illustration and are not intended to limit the scope of the present disclosure.

BRIEF DESCRIPTION OF THE DRAWINGS

The drawings described herein are only used to illustrate exemplary embodiments, rather than all embodiments, of the present disclosure, and are not intended to limit the scope of the present disclosure.

Throughout the drawings, the like reference numerals refer to the like elements or features.

DETAILED DESCRIPTION OF PREFERRED EMBODIMENTS

Figure 1:
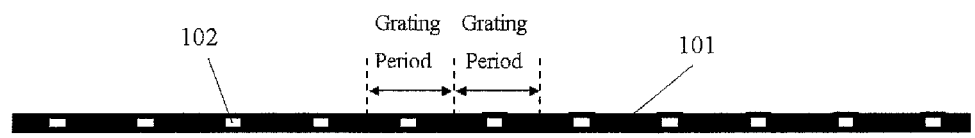
FIG. 1 is a schematic diagram of an optical grating applied in a conventional 3D display device.

In order to make objects, technical solutions and advantages of the present disclosure more clear, the present disclosure will now be further described specifically with reference to the accompanying drawings. Apparently, the described embodiments are just some, rather than all, of the embodiments of the present disclosure. All other embodiments obtained by those skilled in the art based on the embodiments described in the present disclosure without making creative work fall within the scope of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
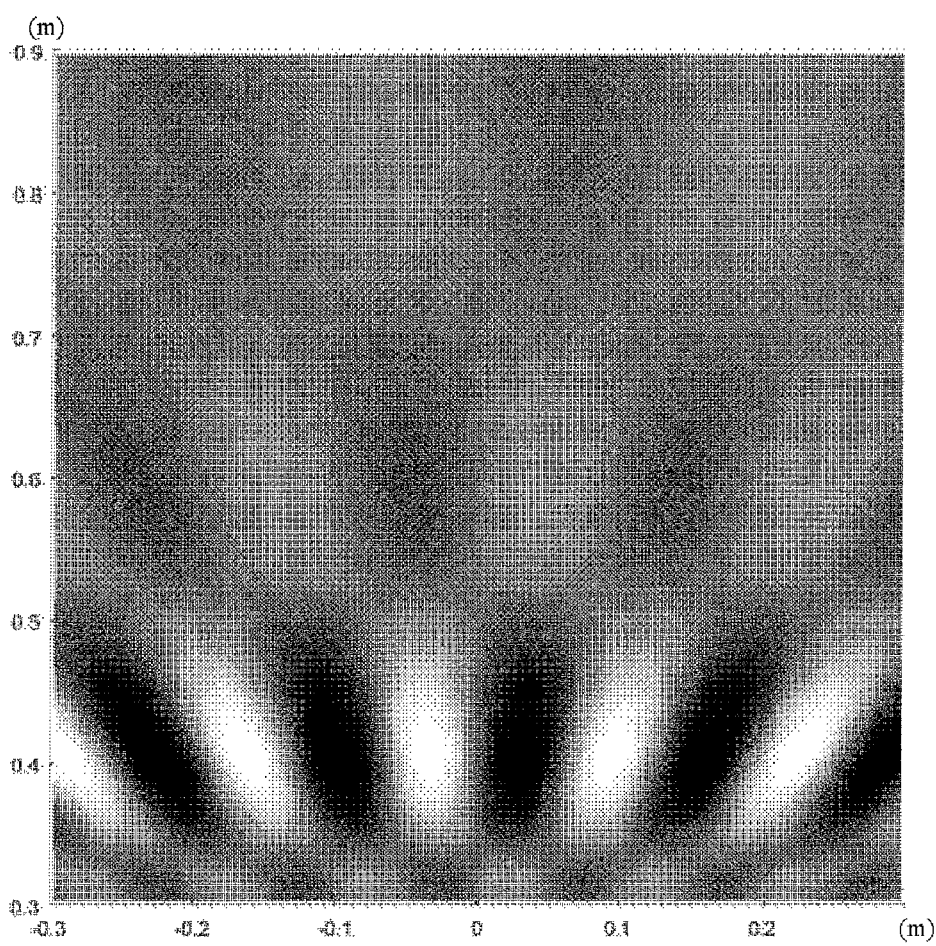
FIG. 2 is a schematic diagram showing an optimal viewing region of a conventional optical grating for 3D display.

As shown in FIG. 1, a conventional naked-eye 3D display device includes an optical grating comprising light shielding stripes 101 and light transmission stripes 102 having uniformly distributed widths, that is, grating periods of respective grating units of the optical grating are equal to one another and are uniformly distributed on the whole. FIG. 2 is a schematic diagram showing an optimal viewing region formed by a conventional optical grating when used for 3D display. In FIG. 2, a brighter white region and a darker black region represent optimal viewing regions for a left eye image and a right eye image respectively. As can be seen from FIG. 2, such optical grating only forms a plurality of smaller optimal viewing regions in front of a screen, so a better viewing effect will be obtained only when an observer is located within the optimal viewing region. The left eye and right eye optimal viewing regions are smaller, thus when the observer move back and forth away from the optimal viewing region, an optimal viewing experience will disappear, and even a phenomenon that the left eye image and the right eye image cross each other would occur.

As can be seen from above, 3D display is obtained in the conventional 3D by using an optical grating with grating units having grating periods which have magnitudes equal to one another. Such optical grating will form a smaller optimal viewing region in front of the screen, thus when the observer moves back and forth, he/she will easily leave the optimal viewing region and thus obtains a poor viewing effect. In embodiments of the present disclosure embodiment, an optical grating is provided such that grating periods of its grating units are non-linearly decreased progressively from the center of the optical grating to either side thereof respectively, so when such optical grating is applied for 3D display, the optimal viewing region can be extended in a longitudinal direction, thereby the viewing experience can be improved.

It is noted that in the optical grating shown in FIG. 1, grating periods of respective grating units are equal to one another, thus each grating period is equal to a sum of widths of one light shielding stripe and one light transmission stripe. In embodiments of the present disclosure, the grating periods of respective grating units are different in magnitude, thus each grating period may be changed as the position of a center of the optical grating varies. Exemplarily, if the center of the optical grating is located at an interface between a light shielding stripe and a light transmission stripe adjacent thereto, "each grating period" is equal to or defined as a sum of widths of one light shielding stripe and one light transmission stripe located adjacent to each other on a same side of the center of the optical grating; if the center of the optical grating is located at a center of the light shielding stripe, "each grating period" is equal to or defined as a width from a center of one light shielding stripe to a center of a next light shielding stripe located at the same side of the center of the optical grating as the one light shielding stripe; if the center of the optical grating is located at a center of the light transmission, "each grating period" is equal to or defined as a width from a center of one light transmission stripe to a center of a next light transmission stripe located at the same side of the center of the optical grating as the one light transmission stripe. In embodiments of the present disclosure, expression of "grating units being non-linearly decreased progressively from the center of the optical grating to either side thereof" means that widths of the light shielding stripes and the light transmission stripes are non-linearly decreased progressively from the center of the optical grating to either side thereof. It will be appreciated that definition or division of the grating units are not limited to those as described exemplarily, and other definition or division ways for the grating units may be utilized by those skilled in the art according to the specific center of the optical grating.

Figure 3:
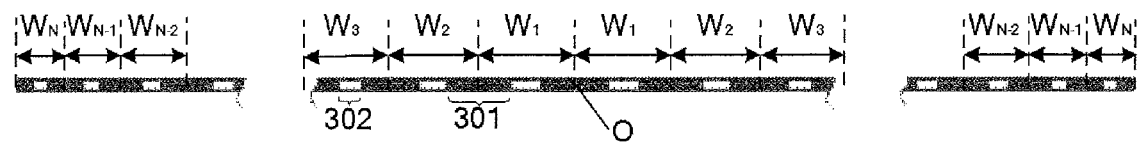
FIG. 3 is a schematic diagram showing an arrangement of grating units of an optical grating according to an exemplary embodiment of the present disclosure.

FIG. 3 is a schematic diagram showing an arrangement of grating units of an optical grating according to an exemplary embodiment of the present disclosure. As shown in FIG. 3, the optical grating comprises light shielding stripes 301 and light transmission stripes 302 arranged to alternate one another. In this embodiment, a center O of the optical grating is located at the center of the light shielding stripe 301. There are N grating units having respective grating periods, $W_1$, $W_2$, $W_3$, ..., $W_{N-1}$, $W_N$, arranged from the center of the optical grating towards either side thereof, and values, magnitudes or widths of the grating periods of the grating units are non-linearly decreased progressively from $W_1$ to $W_N$.

Figure 4:
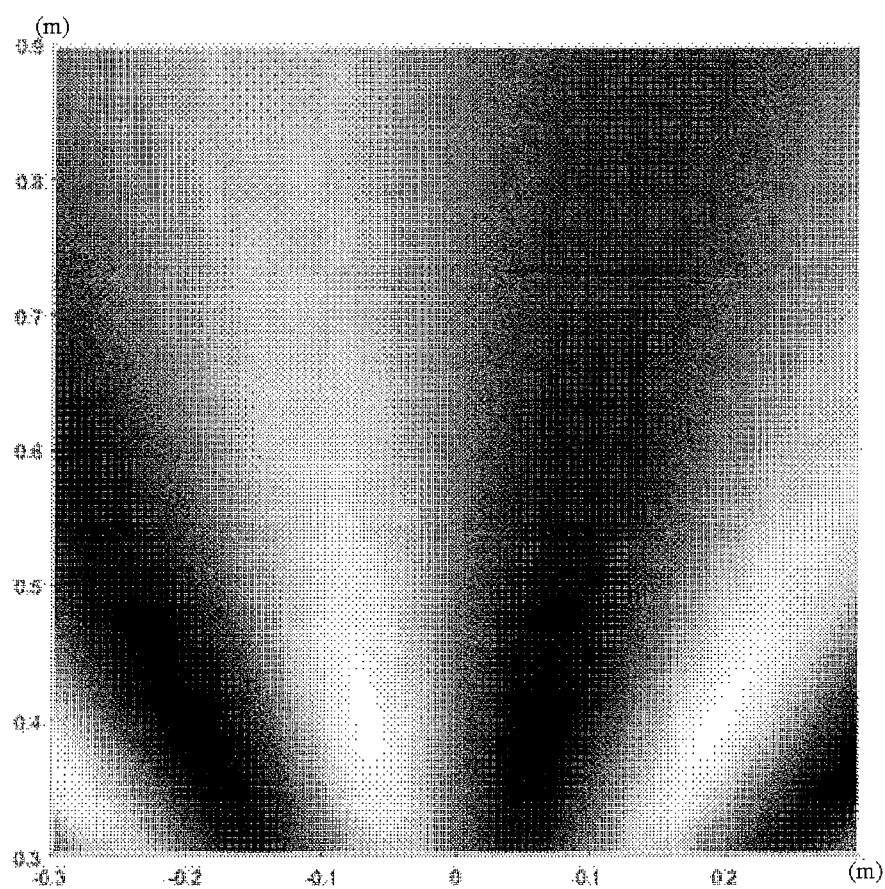
FIG. 4 is a schematic diagram showing an optimal viewing region formed by an optical grating according to an exemplary embodiment of the present disclosure when used for 3D display.

FIG. 4 is a schematic diagram showing an optimal viewing region formed by an optical grating according to an exemplary embodiment of the present disclosure when used for 3D display. Similar to FIG. 2, a brighter white region and a darker black region represent optimal viewing regions for a left eye image and a right eye image respectively. As shown in FIG. 4, the optimal viewing region is extended significantly in a longitudinal direction (a direction perpendicular to a light exit face of the optical grating), so the observer can move back and forth when viewing, without losing the optimal viewing effect, thereby the viewing experience of a user may be improved. Thus, in embodiments of the present disclosure, the grating periods of the grating units of the optical grating are arranged to be non-linearly decreased progressively from the center of the optical grating towards either side, such that the optimal viewing region can be extended in the longitudinal direction, thereby enabling a better viewing experience when applying the optical grating in a 3D display device.

Figure 5:
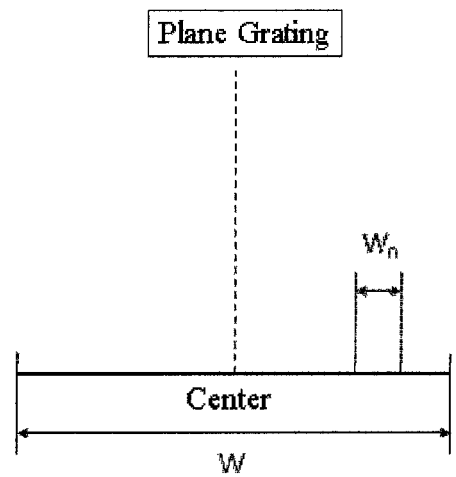
FIG. 5 is a schematic diagram for calculating a grating period of a plane grating.

In an exemplary embodiment, the optical grating may include a plane grating. Values of respective grating periods may be calculated based on a total width of the optical grating and non-linear coefficients corresponding to the respective grating periods. FIG. 5 is a schematic diagram for calculating a grating period of a plane grating. As shown in FIG. 5, taking the center of the optical grating as an origin, coefficients $a_1$, $a_2$, ..., $a_N$ are defined as constants, which satisfy a linearly progressive decreasing relation, respectively for grating periods $W_1$, $W_2$, $W_3$, ..., $W_{N-1}$, $W_N$ arranged rightwards or leftwards, where N is the number of the grating units arranged successively at a right or left side of the center of the optical grating. Starting from the center of the optical grating, the grating period, $W_n$, of the $n^{th}$ grating unit may be calculated from the following equation:

$$W_n = \frac{a_n^2}{a_1^2 + a_2^2 + ... + a_N^2} \cdot \frac{W_T}{2} \quad (1)$$

where $W_T$ is a total width of the plane grating. The coefficients $a_1$, $a_2$, ..., $a_N$ satisfy a linearly progressive decreasing relation, thus as can be seen from the equation (1) that the coefficient, $$\frac{a_n^2}{a_1^2 + a_2^2 + ... + a_N^2},$$

formed by these coefficients is a non-linear coefficient, which is decreased progressively from n=1 to n=N. Therefore, when the total width of the optical grating is known, magnitudes of grating periods of respective grating units of the plane grating may be obtained based on the equation (1) by assigning the coefficients $a_1$, $a_2$, ..., $a_N$ with specific values.

In an embodiment of the present disclosure, the coefficient $a_1$ and $a_N$ may be set such that $0.9 \leq a_N/a_1 < 1$.

Table 1 shows the grating period $W_1$ and the grating period $W_N$ of the optical grating for use in two different sized-3D display devices when $a_N:a_1=0.995:1$.

TABLE 1

| | screen size (inches) | resolution | aperture ratio | $a_N:a_1$ | $W_1$(m) | $W_N$(m) |
|---|---|---|---|---|---|---|
| Example 1 | 13.3 | 1920 × 1080 | 0.3 | 0.995:1 | $3.067e^{-4}$ | $3.036e^{-4}$ |
| Example 2 | 27 | 1920 × 1080 | 0.3 | 0.995:1 | $6.226e^{-4}$ | $6.164e^{-4}$ |

Figure 6:
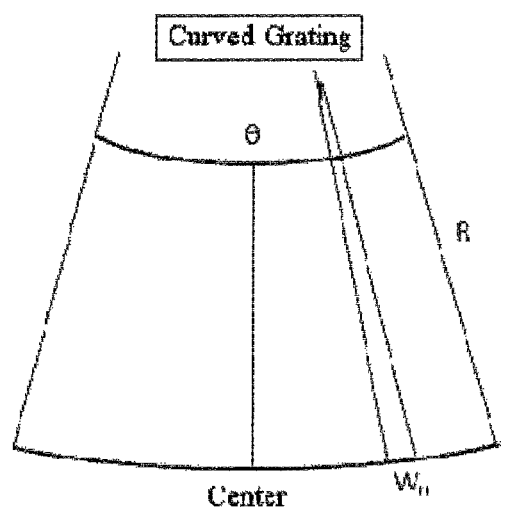
FIG. 6 is a schematic diagram for calculating a grating period of a curved grating.

In another exemplary embodiment, the optical grating may includes a curved grating. FIG. 6 is a schematic diagram for calculating a grating period of a curved grating. As shown in FIG. 6, taking the center of the optical grating as an origin, coefficients $a_1$, $a_2$, ..., $a_N$ are defined as constants, which satisfy a linearly progressive decreasing relation, respectively for grating periods $W_1$, $W_2$, $W_3$, ..., $W_{N-1}$, $W_N$ arranged rightwards or leftwards, where N is the number of the grating units arranged successively at a right or left side of the center of the optical grating. Starting from the center of the optical grating, the $n^{th}$ grating period, $W_n$, may be calculated from the following equation:

$$W_n = \frac{a_n^2}{a_1^2 + a_2^2 + ... + a_N^2} \cdot \frac{\theta}{2} \cdot R \quad (2)$$

where $\theta$ is a central angle of the curved grating, and R is a curvature radius of the curved grating. The formed coefficient, $$\frac{a_n^2}{a_1^2 + a_2^2 + ... + a_N^2},$$

is a non-linear coefficient. Therefore, when $\theta$ and R are known, magnitudes of grating periods of respective grating units of the plane grating may be obtained by assigning the coefficients $a_1$, $a_2$, ..., $a_N$ with specific values.

Figure 7:
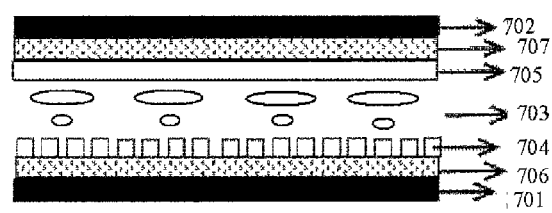
FIG. 7 is a sectional schematic diagram showing a liquid crystal grating.

In an embodiment, the optical grating may include a liquid crystal grating. FIG. 7 is a sectional schematic diagram showing a liquid crystal grating. As shown in FIG. 7, the liquid crystal grating comprises: a first substrate 706 and a second substrate 707 arranged opposite to each other; a liquid crystal layer 703 disposed between the first substrate 706 and the second substrate 707; a first polarizer 701 and a first electrode 704 arranged on upper and lower sides of the first substrate 706 respectively; and a second polarizer 702 and a second electrode 705 arranged on upper and lower sides of the second substrate 707. In some embodiments, one of the first electrode and the second electrode (for example, the first electrode 704 shown in FIG. 7) comprises a plurality of spaced sub-electrodes (for example, stripe-shaped electrodes), while the other of the first electrode and the second electrode may be a plate electrode or may also comprise a plurality of spaced sub-electrodes (for example, stripe-shaped electrodes). Voltage applied between the first and second electrodes is controlled and/or sizes (such as widths, spacings between sub-electrodes, or the like) of the first and second electrodes are designed so as to control transmission of light through the liquid crystal layer at different positions, such that a liquid crystal grating is formed with a plurality of light shielding stripes and a plurality of light transmission stripes alternately arranged, and grating periods of grating units defined by the light shielding stripes and the light transmission stripes of the liquid crystal grating are non-linearly decreased progressively from the center of the liquid crystal grating towards either side thereof. In other embodiments, a plurality of spaced electrodes are only arranged on a side of one of the first substrate and the second substrate facing the liquid crystal layer, and voltages applied onto these electrode may be controlled and/or sizes (such as widths, spacings or the like) are designed so as to control transmission of light through the liquid crystal layer at different positions, such that a liquid crystal grating is formed with a plurality of light shielding stripes and a plurality of light transmission stripes alternately arranged, and grating periods of grating units defined by the light shielding stripes and the light transmission stripes of the liquid crystal grating are non-linearly decreased progressively from the center of the liquid crystal grating towards either side thereof.

In other embodiments, the optical grating may include other types of optical gratings except the liquid crystal grating, for example, an optical grating formed by engraving a number of parallel notches in a glass sheet, where the notch is formed as a light shielding stripe while a portion between two notches is formed as a light transmission stripe.

In an embodiment of the present disclosure, the grating periods of the optical grating may be set to match with sizes of pixels, for example, each grating period may be set in an order of magnitude from 6 microns to 500 microns.

In an example, the aperture ratio of the optical grating is about 0.3, that is, for each grating period, the width of a corresponding light transmission stripe is set to be about 30% of the grating period. With this setting for width, a better display effect may be achieved.

Figure 8:
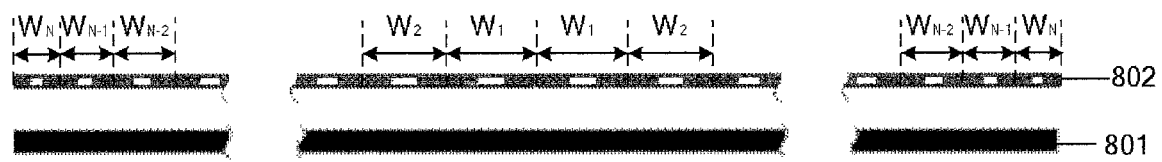
FIG. 8 is a schematic diagram showing a 3D display device according to an exemplary embodiment of the present disclosure.

In an embodiment according to another aspect of the present disclosure, there is further provided a 3D display device. FIG. 8 is a schematic diagram showing a 3D display device according to an exemplary embodiment of the present disclosure. As shown in FIG. 8, the 3D display device comprises a display panel 801 (for example, a liquid crystal panel) and an optical grating 802 arranged at a light exit side of the display panel 801, and the optical grating 802 comprises grating units having grating periods arranged to be non-linearly decreased progressively from a center of the optical grating towards either side thereof.

In the 3D display device provided in embodiments of the present disclosure, grating periods of the grating units of the optical grating are arranged to be non-linearly decreased progressively from a center of the optical grating towards either side thereof, such that the optimal viewing region may be extended in a longitudinal direction, thereby enabling a better viewing experience.

Unless otherwise explicitly indicated in the context, a singular form of a words used in the description and the attached claims includes plural, vice versa. Thus, when a singular form is mentioned, its corresponding plural is generally included. Similarly, wordings such as "include" and "comprise" will be interpreted as inclusion rather than being exclusive. Also, words "and" and "or" shall be interpreted as inclusion, unless such interpretation is otherwise expressly excluded herein. Phrase "example" used herein, especially, used after a group of words, is only exemplary and illustrative, and should not be regarded as being exclusive or general.

The foregoing description of the embodiments is provided for purposes of explanation and illustration, and is not intended to be exhaustive or to limit the present disclosure. Elements or features in particular embodiments are generally limited to be used in the particular embodiments, rather in suitable situations, may be interchangeable and may be used in other embodiments, even these are not particularly shown or described. Also, there are various forms of modifications, which are made without departing from spirit and scopes of the disclosure and are included within scopes of the present disclosure.

What is claimed is:

1. An optical grating, comprising:
a plurality of light shielding stripes each of which has a straight-line shape and is configured to shield a light; and
a plurality of light transmission stripes each of which has a straight-line shape and is configured to transmit a light, wherein the plurality of light shielding stripes and the plurality of light transmission stripes are alternately arranged, and define a plurality of grating units arranged from a center of the optical grating towards two sides thereof, and values of grating periods of all of a plurality of said grating units on either side of the center being non-linearly decreased progressively from the center to the side,
wherein the optical grating is a plane grating, and the grating period, $W_n$, of the $n^{th}$ grating unit starting from the center of the plane grating is:

$$W_n = \frac{a_n^2}{a_1^2 + a_2^2 + \ldots + a_N^2} \cdot \frac{W_T}{2}$$

where $W_T$ is a total width of the plane grating; N is the number of the grating units on either side of the center of the plane grating; $a_1, a_2, \ldots, a_N$ are user-defined coefficients for grating periods of the respective grating units on either side of the center of the plane grating and satisfy a linearly progressive decreasing relation, or
wherein the optical grating is a curved grating, and the grating period, $W_n$, of the $n^{th}$ grating unit starting from the center of the curved grating is:

$$W_n = \frac{a_n^2}{a_1^2 + a_2^2 + \ldots + a_N^2} \cdot \frac{\theta}{2} \cdot R$$

where R is a curvature radius of the curved grating; $\theta$ is a central angle of the curved grating; N is the number of the grating units on either side of the center of the curved grating; $a_1, a_2, \ldots, a_N$ are user-defined coefficients for grating periods of the respective grating units on either side of the center of the curved grating and satisfy a linearly progressive decreasing relation.

2. The optical grating according to claim 1, wherein $0.9 \leq a_N/a_1 < 1$.

3. The optical grating according to claim 1, wherein the optical grating is a liquid crystal grating.

4. The optical grating according to claim 3, wherein the liquid crystal grating comprises a first substrate and a second substrate arranged opposite to each other, a liquid crystal layer disposed between the first substrate and the second substrate, and electrodes arranged on a side of at least one of the first substrate and the second substrate facing the liquid crystal layer, the electrodes are configured and arranged to, when being applied with a voltage, control transmission of light through the liquid crystal layer at different positions such that a liquid crystal grating is formed with a plurality of light shielding stripes and a plurality of light transmission stripes alternately arranged, and grating periods of a plurality of grating units defined by the light shielding stripes and the light transmission stripes of the liquid crystal grating are non-linearly decreased progressively from the center of the liquid crystal grating towards either side thereof.

5. The optical grating according to claim 1, wherein:
   if the center of the optical grating is located at an interface between a light shielding stripe and a light transmission stripe adjacent thereto, the grating period of each of the grating units is equal to a sum of widths of one light shielding stripe and one light transmission stripe located adjacent to each other on a same side of the center of the optical grating;
   if the center of the optical grating is located at a center of the light shielding stripe, the grating period of each of the grating units is equal to a width from a center of one light shielding stripe to a center of a next light shielding stripe located at the same side of the center of the optical grating as the one light shielding stripe; and
   if the center of the optical grating is located at a center of the light transmission, the grating period of each of the grating units is equal to a width from a center of one light transmission stripe to a center of a next light transmission stripe located at the same side of the center of the optical grating as the one light transmission stripe.

6. The optical grating according to claim 4, wherein
   if the center of the optical grating is located at an interface between a light shielding stripe and a light transmission stripe adjacent thereto, the grating period of each of the grating units is equal to a sum of widths of one light shielding stripe and one light transmission stripe located adjacent to each other on a same side of the center of the optical grating;
   if the center of the optical grating is located at a center of the light shielding stripe, the grating period of each of the grating units is equal to a width from a center of one light shielding stripe to a center of a next light shielding stripe located at the same side of the center of the optical grating as the one light shielding stripe; and
   if the center of the optical grating is located at a center of the light transmission, the grating period of each of the grating units is equal to a width from a center of one light transmission stripe to a center of a next light transmission stripe located at the same side of the center of the optical grating as the one light transmission stripe.

7. The optical grating according to claim 1, wherein an aperture ratio of the optical grating is 0.3.

8. The optical grating according to claim 1, wherein the values of the grating units are within a range from 6 microns to 500 microns.

9. A 3D display device, comprising a display panel and the optical grating of claim 1, the optical grating being arranged at a light exit side of the display panel.

\* \* \* \* \*